US012659673B2

(12) United States Patent
Heubi et al.

(10) Patent No.: US 12,659,673 B2
(45) Date of Patent: Jun. 16, 2026

(54) ULTRA-LOW LATENCY NFMI COMMUNICATION PROTOCOL

(71) Applicant: SEMICONDUCTOR COMPONENTS INDUSTRIES, LLC, Scottsdale, AZ (US)

(72) Inventors: Alexander Heubi, La Chaux-de-Fonds (CH); Ivo Leonardus Coenen, Coffrane (CH)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 260 days.

(21) Appl. No.: 18/341,993

(22) Filed: Jun. 27, 2023

(65) Prior Publication Data

US 2024/0348991 A1 Oct. 17, 2024

Related U.S. Application Data

(60) Provisional application No. 63/496,295, filed on Apr. 14, 2023.

(51) Int. Cl.
*H04J 3/24* (2006.01)
*H04R 25/00* (2006.01)

(52) U.S. Cl.
CPC ......... *H04R 25/407* (2013.01); *H04R 25/505* (2013.01)

(58) Field of Classification Search
CPC ..... H04R 25/407; H04R 25/505; H04R 25/00
USPC .......................................................... 370/349
See application file for complete search history.

(56) References Cited

U.S. PATENT DOCUMENTS

| | | | | |
|---|---|---|---|---|
| 9,661,425 | B2 * | 5/2017 | Solum | H04R 25/55 |
| 9,706,317 | B2 * | 7/2017 | Mustiere | H04R 25/305 |
| 9,712,930 | B2 * | 7/2017 | Mustiere | H04R 25/554 |
| 9,813,815 | B2 * | 11/2017 | Pedersen | H04R 5/04 |
| 9,838,829 | B2 * | 12/2017 | El-Hoiydi | H04L 1/1657 |
| 10,237,774 | B2 * | 3/2019 | Klatt | H04W 16/18 |

(Continued)

FOREIGN PATENT DOCUMENTS

| | | | | |
|---|---|---|---|---|
| DE | 112019007495 T5 | 3/2022 | | |
| EP | 2416508 A2 * | 2/2012 | | H04W 56/002 |

(Continued)

OTHER PUBLICATIONS

Search Report for counterpart DE Application No. 10 2023 127 159.8, mailed Jun. 21, 2024, 5 pages.

*Primary Examiner* — Marceau Milord
(74) *Attorney, Agent, or Firm* — Ramey LLP

(57) ABSTRACT

Audio communication methods, devices, and systems are provided with an ultra-low latency communications protocol. One illustrative communication method suitable for a primary hearing instrument includes: transmitting a preamble packet to initiate a wireless connection; after receiving a preamble response packet, wirelessly sending a downlink stream of audio data frames; and wirelessly receiving an uplink stream of audio data frames. The audio data frames of the downlink stream and the uplink stream each consist of a message packet, a check packet, and multiple single-sample audio data packets, and these packets exclude any preambles or sync words. The audio data frame packets of the downlink stream and the uplink stream are interleaved with each other.

20 Claims, 5 Drawing Sheets

(56) References Cited

U.S. PATENT DOCUMENTS 11,088,785 B2 * 8/2021 Vaidya .................. H04L 1/1896
11,503,415 B1 * 11/2022 Sorensen ............. H04R 25/505
11,503,416 B2 * 11/2022 Coenen ................ H04R 25/552
11,743,963 B2 * 8/2023 Li ........................... H04W 4/80 370/409
11,848,785 B2 * 12/2023 Haartsen ................. H04L 69/18
11,910,289 B2 * 2/2024 Arunachalam .......... H04R 3/12
11,916,987 B2 * 2/2024 Cheong ................... H04W 4/80
12,052,780 B2 * 7/2024 Chen .................... H04R 1/1041
12,159,081 B2 * 12/2024 Gallo ................... H04R 1/1091
2002/0080719 A1 * 6/2002 Parkvall ................ H04L 1/0001 370/252
2009/0097588 A1 * 4/2009 El-Agha ............... H04L 25/493 375/295
2010/0021175 A1 * 1/2010 Kagawa ............. H04B 10/5561 398/101
2012/0033620 A1 * 2/2012 Thoen ................... H04J 3/0697 370/329
2013/0102251 A1 4/2013 Linde et al.
2015/0341724 A1 * 11/2015 Pedersen ................. H04W 4/80 381/300
2018/0176714 A1 * 6/2018 Fu ......................... H04L 67/564
2019/0044576 A1 * 2/2019 Thoen ...................... H04B 5/24
2019/0246221 A1 * 8/2019 Shariati .................. H04N 21/00
2020/0107174 A1 4/2020 Tong et al.
2020/0396028 A1 * 12/2020 Haartsen ................. H04L 69/40
2021/0235528 A1 * 7/2021 Morris .................... H04W 4/70
2022/0141893 A1 * 5/2022 Choi .................... H04R 1/1091 370/329
2022/0182341 A1 * 6/2022 Yu ........................... H04L 47/34
2022/0217480 A1 * 7/2022 Coenen ................ H04R 25/552
2022/0264672 A1 * 8/2022 Chen ....................... H04W 4/80
2022/0329998 A1 * 10/2022 Arunachalam ..... H04L 67/1044
2022/0408202 A1 * 12/2022 Oesch ................. H04L 65/1059
2023/0007414 A1 * 1/2023 Coenen ................ H04R 25/554
2023/0084332 A1 * 3/2023 Gallo ...................... H04L 65/80 700/94
2023/0137847 A1 * 5/2023 Goyal ................. H04W 12/033 380/270
2023/0217195 A1 * 7/2023 Poltorak .............. H04R 25/609 381/315
2023/0370511 A1 * 11/2023 Cheong ................... H04L 65/60

FOREIGN PATENT DOCUMENTS

EP 3258707 A1 12/2017
WO WO-2018141789 A1 * 8/2018 ........... H04R 25/305

* cited by examiner

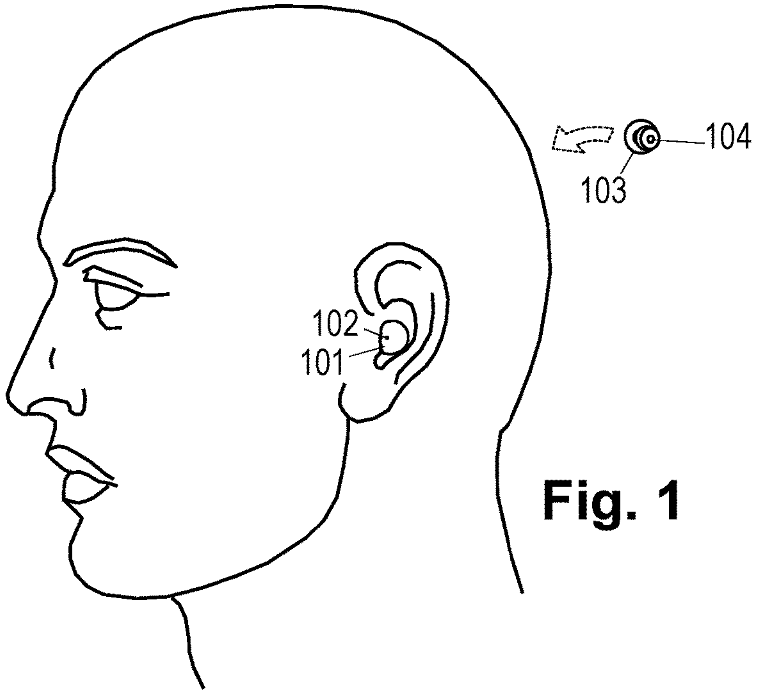
Fig. 1
Fig. 2
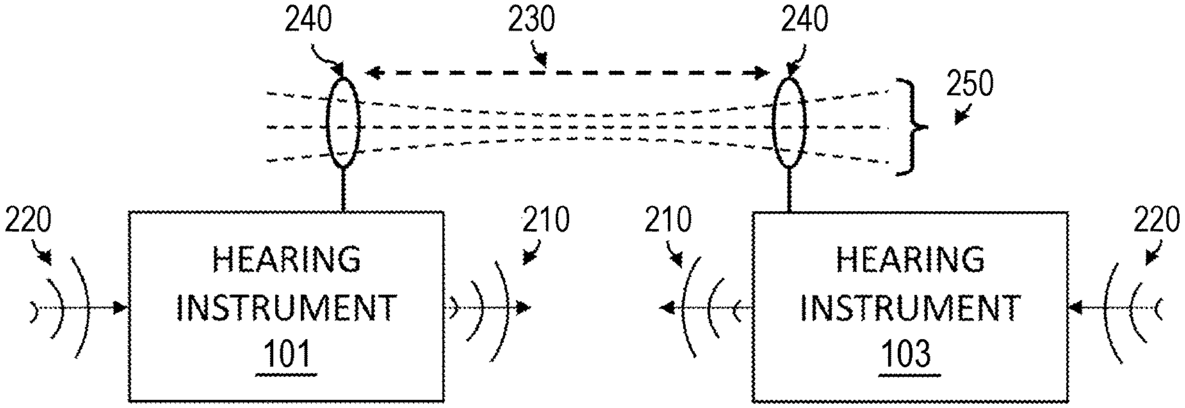

Fig. 5
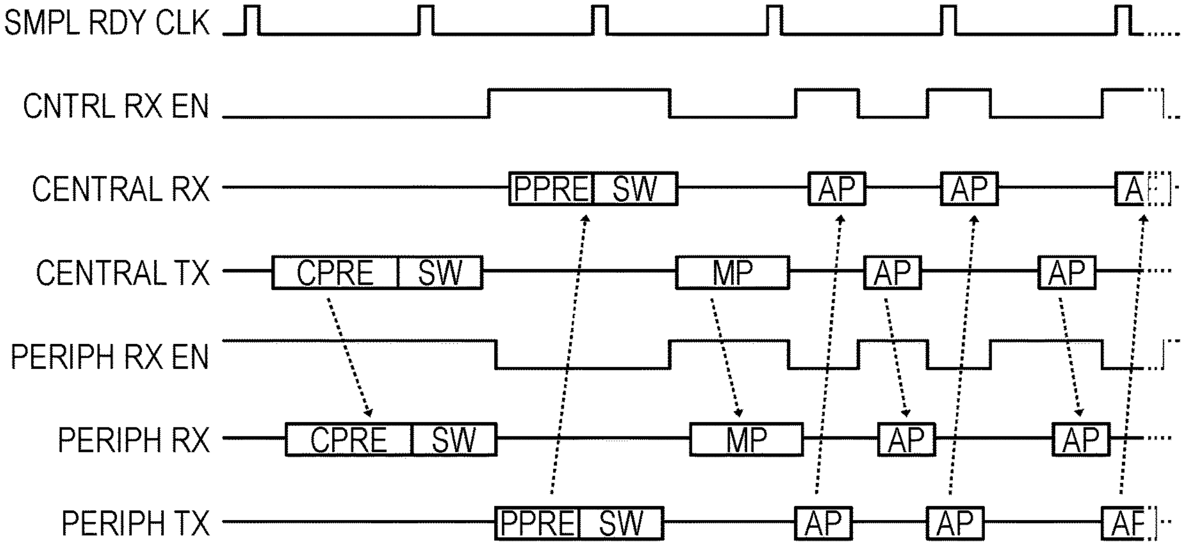
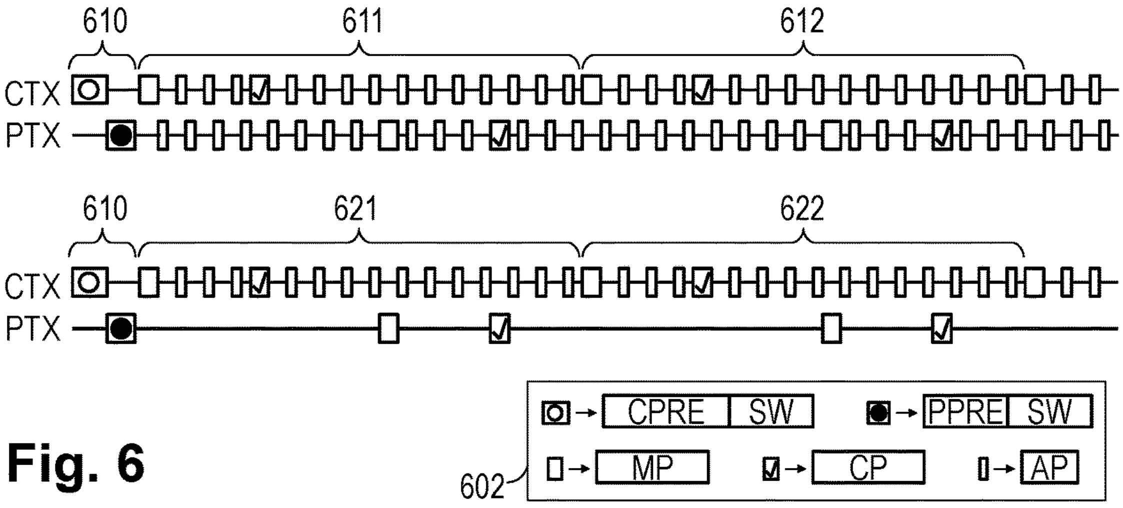
Fig. 6

ULTRA-LOW LATENCY NFMI COMMUNICATION PROTOCOL

CROSS-REFERENCE TO RELATED APPLICATIONS

The present application claims priority to Provisional U.S. Application 63/469,295 filed 2023 Apr. 14 and titled "Ultra-low latency NFMI communication protocol" by inventors A. Heubi and I. Coenen, which is hereby incorporated herein by reference. The present application further relates to pending U.S. application Ser. No. 17/931,747 filed 2022 Sep. 13 and titled "Low-latency communication protocol for binaural applications" by inventors I. Coenen and D. Mitchler, which is hereby incorporated herein by reference. Application Ser. No. 17/931,747 is a divisional of issued U.S. Pat. No. 11,503,416, filed 2021 Jan. 7 with the same title and inventors, and also hereby incorporated herein by reference.

FIELD OF THE DISCLOSURE

The present disclosure relates to point-to-point wireless communication and more specifically to a digital wireless communication protocol providing low latency to facilitate binaural applications for hearing instruments.

BACKGROUND

Hearing instruments, such as hearing aids or ear-worn speakers (e.g., ear buds), can be worn in or on each ear of a user to provide sound to a user. Additionally, the hearing instruments may include one or more microphones to receive audio signals from an environment of the user. For example, audio from the environment may be received and converted (i.e., sampled) into a first digital signal (i.e., left channel) by a left-worn hearing instrument, and audio from the environment may be received and converted into a second digital signal (i.e., right channel) by a right-worn hearing instrument. Processing to improve a user's hearing experience is possible if the left channel and the right channel can be processed together (i.e., binaural processing).

Such binaural processing requires communication, preferably wireless digital communication, between the hearing instruments. Power for such communication is limited primarily by size and weight restrictions, but also by the desire to minimize electromagnetic interference. The short distance between a user's ears enables the effective use of near field magnetic induction (NFMI) for wireless digital communication, offering efficiency but limiting the available frequency range. Existing communications protocols can introduce a substantial communications latency in such systems. Such latencies impair the performance of binaural processing techniques such as beamforming.

SUMMARY

Accordingly, there are disclosed herein ultra-low latency communication protocol, methods, devices, and systems suitable for providing wireless digital communication of audio data. One illustrative communication method suitable for a central (aka primary, master) hearing instrument includes: transmitting a preamble packet to initiate a wireless connection; after receiving a preamble response packet, wirelessly sending a downlink stream of audio data frames; and wirelessly receiving an uplink stream of audio data frames. The audio data frames of the downlink stream and the uplink stream each consist of a message packet, a check packet, and multiple single-sample audio data packets, and these packets exclude any preambles or sync words. The audio data frame packets of the downlink stream and the uplink stream are interleaved with each other.

An illustrative communication method suitable for a peripheral (aka secondary, slave) hearing instrument includes: wirelessly receiving a preamble packet to initiate a wireless connection; responsively transmitting a preamble response packet; after transmitting the preamble response packet, receiving a downlink stream of audio data frames; and responsive to each audio data frame packet of the downlink stream, sending an audio data frame packet of an uplink stream.

An illustrative hearing instrument includes: an analog to digital converter to produce a series of local audio samples; a digital signal processor to obtain a series of output audio samples by combining the series of local audio samples with a series of received audio samples; a digital to analog converter to convert the series of output audio samples into an output audio signal; and a wireless signal transceiver to send a downlink stream of audio data frames representing the series of local audio samples and to receive an uplink stream of audio data frames representing the series of received audio samples. The audio data frames of the downlink stream and the uplink stream each consist of a message packet, a check packet, and multiple single-sample audio data packets. The audio data frame packets exclude any preambles or sync words, and the audio data frame packets of the downlink stream are interleaved with those of the uplink stream.

The foregoing methods and instruments may be implemented separately or conjointly, together with one or more of the following optional features in any suitable combination: 1. the preamble packet comprises a preamble and ends with a sync word. 2. the preamble response packet comprises a shortened preamble and the sync word. 3. the message packet and the check packet each include a single audio data sample. 4. using a shared clock source for sampling audio data for the downlink stream and for said wirelessly sending the downlink stream. 5. the transceiver is configured to initiate a wireless connection with a second hearing instrument by sending a preamble packet that includes a preamble and ends with a sync word. 6. the transceiver is configured to send the downlink stream only after receiving a preamble response packet having a shortened preamble and the sync word. 7. the wireless connection is via near field magnetic induction. 8. deriving a communication clock from the preamble packet and the downlink stream and using the communication clock for said transmitting and receiving.

BRIEF DESCRIPTION OF THE DRAWINGS

FIG. 1 is an environmental representation of an illustrative binaural hearing instrument pair.

FIG. 2 is a schematic representation of the binaural hearing instrument pair.

FIG. 5 is a timing diagram of an illustrative communications protocol.

FIG. 6 is a second timing diagram for the illustrative communications protocol.

DETAILED DESCRIPTION

Figure 3:
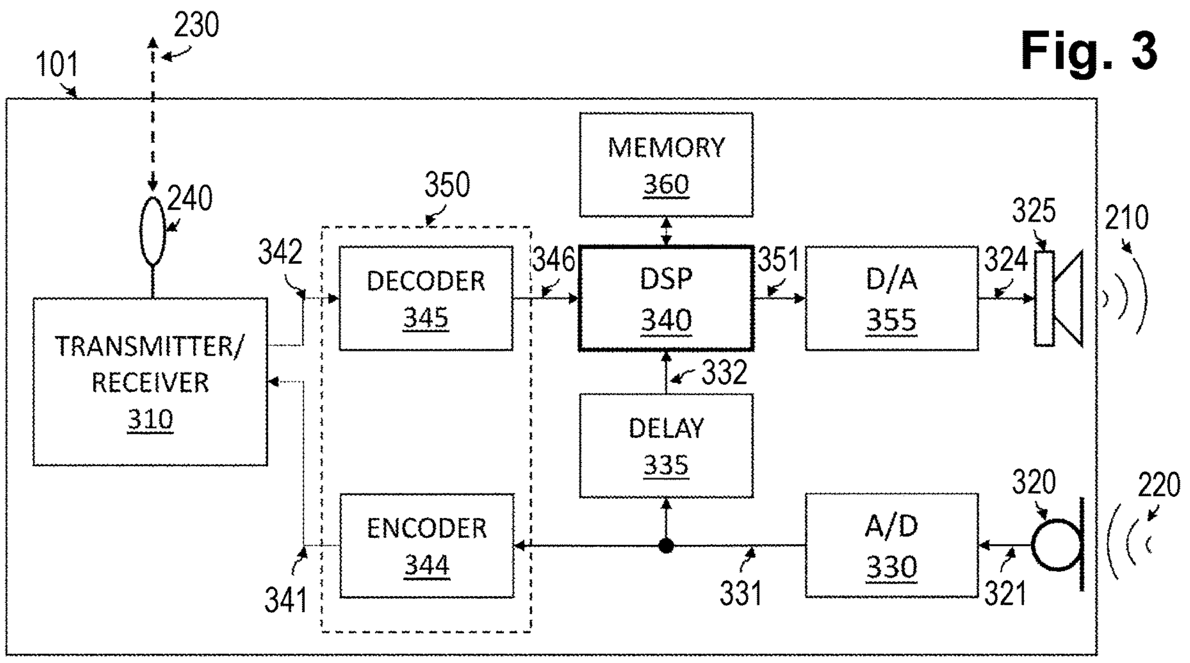
FIG. 3 is a function block diagram of an illustrative hearing instrument.

The following description and accompanying drawings are provided for explanatory purposes, not to limit the disclosure. In other words, they provide the foundation for one of ordinary skill in the art to recognize and understand all modifications, equivalents, and alternatives falling within the scope of the claims.

Binaural processing can improve a user's hearing experience by processing audio received at different hearing instruments (e.g., worn at each ear of the user). For example, a user that is deaf in one ear may hear a combined left/right audio channel in the hearing ear so that sounds on the side of the user's deaf ear may be heard more easily. In another example, a user may receive audio with reduced noise, using a binaural processing technique known as beamforming. Conventional wireless digital communication protocols (e.g., Bluetooth, WiFi) introduce a communication delay (aka transport delay, latency) that can negatively affect the binaural processing. Disclosed herein are circuits and methods to reduce wireless digital communication latency to facilitate binaural processing, such as beamforming.

Beamforming may be performed on audio from two spatially separated microphones on a single hearing instrument (i.e., monaural beamforming); however, beamforming performed on audio from microphones on a left hearing instrument at a left ear of the user and a right hearing instrument at a right ear of the user (i.e., binaural beamforming) may offer some advantages. For example, the audio from the left and right hearing instruments may have an interaural delay and amplitude difference resulting from the separation between the left/right ears and a direction of the sound, which can improve a quality the beamforming.

FIG. 1 is an environmental representation showing a left hearing instrument 101 placed in a user's left ear and a right hearing instrument 103 oriented for placement in a user's right ear. Each hearing instrument includes at least one microphone 102 and a speaker 104 for producing sound in the user's ear canal. The disclosed principles are also applicable to hearing instruments configured to cover or enclose the ears and to hearing instruments that produce sound in other ways, e.g., using bone conduction transducers or electromagnetic coupling with an implant.

Conventional digital wireless communication often includes propagating radio frequency (RF) signals (e.g., 2.4 gigahertz (GHz)) between a transmitter antenna and a receiver antenna. For conventional digital wireless communication, such as Bluetooth and WiFi, the RF signals are intended to propagate according to far-field transmission principles. Communicating between hearing instruments worn in opposite ears using these forms of digital wireless communication could result in (at least) poor efficiency and interference with other devices. To avoid these problems, the disclosed circuits and methods can use a near field magnetic induction (NFMI) communication technology, which is better suited for wireless communication between body worn devices, such as hearing instruments.

FIG. 2 is a block diagram of a binaural sound system including hearing instruments communicating via NFMI according to a possible implementation of the present disclosure. The binaural sound system includes two hearing instruments 101, 103. Each hearing instrument 101, 103 can be configured to be worn near or touching an ear of a user. For example, in a possible implementation, the hearing instruments are a left hearing instrument 101 and a right hearing instrument 103 worn (at least partially) in an ear canal of the user. Each hearing instrument 101, 103 can include one or more speakers for projecting sounds 210 (e.g., beamformed audio) from the hearing instrument. Each hearing instrument 101, 103 can also include one or more microphones for receiving sounds 220 from an environment. Each hearing instrument 101, 103 may also include a transmitter and/or a receiver. For example, each hearing instrument 101, 103 may include a transmitter and receiver (collectively "transceiver") configured to transmit and receive digital data over a wireless communication link 230 (e.g., a bidirectional wireless communication link). As mentioned previously, the wireless communication link 230 may include NFMI.

NFMI facilitates digital communication over a short range (e.g., <1 meter). For NFMI communication, each hearing instrument 101, 103 can include a coil 240 that is coupled to that hearing instrument's transceiver. The transmitter of a first hearing instrument 101 can be configured to excite a current in a coil 240 of the transmitter to produce a magnetic field 250 that is inductively coupled to a coil 240 of a receiver of a second hearing instrument 103. The magnetic field 250 may be modulated (e.g., frequency shift key (FSK) modulation) for communicating digital information between the hearing instruments. The coils may be substantially similar (e.g., identical) and can be arranged to optimize magnetic coupling to maximize the efficiency of NFMI. Further, magnetic field 250 can be tightly coupled, having an amplitude that drops quickly with range (i.e., near field transmission). Accordingly, NFMI communication can minimize interference with other devices. For digital communication, the magnetic field 250 may be modulated in a high-frequency (HF) band carrier (e.g., 10-14 megahertz (MHz)). Signals in the HF band may experience less distortion/absorption from the human body than conventional RF signal frequencies (e.g., 2.4 GHz).

FIG. 3 is a block diagram of an illustrative hearing instrument 101. As mentioned previously, the hearing instrument can include a transceiver 310 coupled to a wireless transducer, such as an antenna or a coil 240. The transceiver 310 may be implemented as a discrete transmitter and receiver or may be implemented as an integrated device that includes a transmitter portion and receiver portion. Transceiver 310 may transmit and receive digital data (e.g., an audio data stream) over wireless communication link 230 via a coil 240 configured for NFMI.

The hearing instrument 101 includes at least one microphone 320 configured to convert received sounds 220 into an analog audio signal 321. The analog audio signal 321 is coupled to an analog-to-digital converter (A/D) 330 that is configured to periodically sample (i.e., samples spaced by a sampling period) the analog audio signal 321 at a sample rate (e.g., 24 kilohertz (kHz)) and to convert the analog audio samples into digital samples having a binary representation of their amplitude (e.g., 16 bits), and to output the digital samples in sequence as a digital data series 331. The series of digital audio samples 331 may be transmitted to a processor (e.g., a digital signal processor (DSP)) 340, which can be configured to use the series 331 as a channel for binaural processing, such as beamforming. In a possible implementation, the hearing instrument can include a delay buffer 335 that is configured to generate a series 332 of delayed digital audio samples for the processor 340. The delay buffer 335 may provide a desired delay for the chosen binaural processing application and may further be configurable to compensate for wireless communications latency of the digital audio samples from the other hearing instrument. The series of digital audio samples may also be provided to an audio encoder 344 that is configured to encode (e.g., compress) the digital data stream to reduce a number of bits communicated over the wireless communication link 230. The audio encoder 344 may be a portion of an audio codec 350 that includes (at least) an encoder 344 and a decoder 345. The audio codec 350 may be one of a plurality of possible types, including (but not limited to) an adaptive differential pulse-code modulation (ADPCM) codec. The encoder 344 may output an encoded data stream 341 for transmission to a transmitter portion of the transceiver 310 for transmission to another hearing instrument.

The transceiver 310 may further include a receiver portion that is configured to receive an encoded data stream from another hearing instrument over the wireless communication link 230 via the coil 240. The receiver portion may couple the received encoded data stream 342 to the decoder 345. The decoder 345 can be configured to decode (e.g., decompress) the received encoded data stream and output a series 346 of received digital audio samples 346 to the DSP 340.

The DSP 340 may be configured to process the local digital audio sample series 331 (aka first channel, local channel) and the received digital audio sample series 346 (aka second channel, remote channel, received channel) for a binaural application and to output a processed series of digital audio samples 351. The processed digital data series 351 can be a combination of the local channel 331 and the remote channel 346. In a possible implementation, the DSP 340 is configured (e.g., by software) to perform beamforming processing on the first channel and the second channel.

The hearing instrument 101 may further include a non-transitory computer readable information storage medium (e.g., nonvolatile memory) 360. The memory 360 may be configured to store a computer program product (i.e., software) including instructions that, when executed by a processor, configure the processor to perform operations to enable functionality of the hearing instrument. For example, the memory 360 may include stored instructions that can configure the DSP 340 to perform a beamforming process (i.e., method). Additionally, or alternatively, the memory may include stored instructions that can configure a processor (e.g., the DSP 340 or a separate microcontroller) to perform a method associated with an ultra-low latency NFMI communication protocol.

The hearing instrument 101 may further include a digital-to-analog converter (D/A) 355 that is configured to parse the digital samples of the processed digital data series 351 and to generate an analog speaker signal 324 based on the digital samples. The analog speaker signal 324 can be amplified and coupled to at least one speaker 325 of the hearing instrument 101 to produce transmitted sounds 210. The transmitted sounds 210 may provide an improved hearing experience for a user because of the binaural processing. For example, the transmitted sounds may include less noise than transmitted sounds without the processing provided by the binaural application.

As mentioned, the hearing instrument 101 shown in FIG. 3 can be one of two hearing instruments worn in the ears of a user. In this case, the hearing instrument worn in the left ear can be the same as the hearing aid worn in the right ear. In other words, processing may be performed at each hearing instrument. Alternatively, a first hearing instrument in a pair can include a subset of the circuits/subsystems found in a second hearing instrument in the pair. In other words, processing for a binaural application may be performed at one hearing instrument in the pair. In either case, a wireless communication link 230 between the hearing instrument may be required. The wireless communication link 230 may rely on a low-latency communication protocol to optimize the processing for the binaural application.

Figure 4:
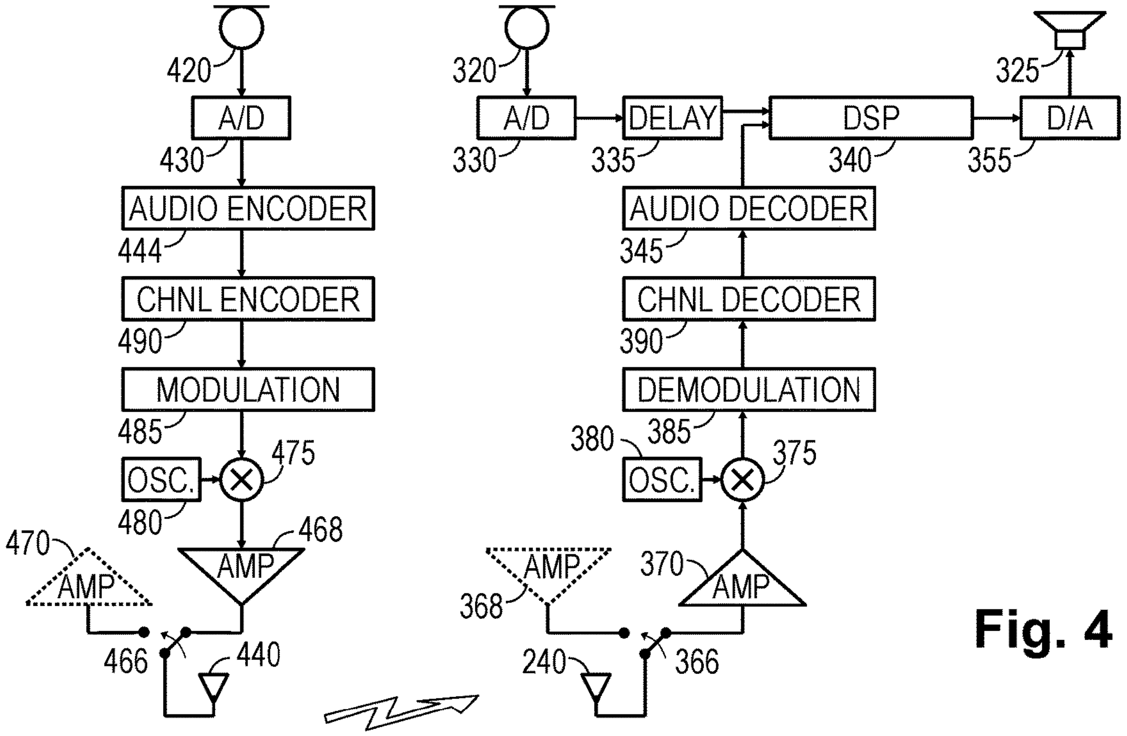
FIG. 4 is a signal flow diagram for one output signal of an illustrative binaural hearing instrument pair.

To illustrate cooperation between multiple hearing instruments, FIG. 4 is a signal flow diagram for one output signal of an illustrative binaural hearing instrument pair. To simplify the diagram, many of the components for the other output signal are omitted but can be understood as a mirror image of the illustrated components.

The remote channel used by the processor 340 to generate a series of output audio samples for D/A converter 355 begins as sound received by a microphone 420 in the remote hearing instrument. In accordance with a sample clock, an A/D converter 430 digitizes samples of the analog signal to produce a series of remote audio samples. An audio encoder 444 compresses the series of audio samples to reduce bandwidth requirements. An audio encoder such as, e.g., an adaptive differential pulse code modulator (ADPCM) enables a series of 24-bit audio signal samples to be well represented as a series of, e.g., 5-bit quantized errors measured relative to the output of a recursive prediction filter. Moreover, a 16-bit audio stream can be well represented as a series of 4-bit or 5-bit quantized errors depending on the sophistication of the recursive prediction filter.

Because the compression process removes most of the signal redundancy, a channel encoder 490 re-introduces a controlled amount of redundancy to enable error detection and correction. As one example, two Hamming parity polynomial bits can be added to each five bits to enable one bit error of the seven total bits to be corrected (single-error correction, or SEC) or detection of up to two bit errors in a seven-bit packet (dual error detection, or DED). Additional parity bits can be added to further increase the detectable and/or correctable number of errors in each packet, at the cost of requiring additional channel bandwidth. The channel encoder 490 may further apply a scrambling mask to the data before or after the parity bits are added. Such randomization of the data tends to improve system performance particularly when the data might otherwise exhibit a predictable pattern, e.g., a low-noise environment.

A modulator 485 maps the packet bits to channel symbols, e.g., representing each zero with a first frequency and each one with a second different frequency. Other illustrative forms of modulation include amplitude shift keying (ASK) and phase shift keying (PSK). As explained further below, the modulator 485 in the central hearing device employs a transmit clock that is based on the local A/D sample clock or derived from the same clock source as the sample clock. This shared clock source facilitates synchronization of at least the downlink stream to the audio samples. A mixer 475 multiplies the channel signal with a carrier signal from an oscillator 480 to provide a frequency upshift to the modulated signal. An amplifier 468 filters the upshifted signal and applies it as a drive signal via mode switch 466 to antenna 440. The mode switch 466 switches the antenna coupling between the transmit amplifier 468 and the receive amplifier 470.

Antenna 440 converts the drive signal to electromagnetic fields that produce a receive signal in another antenna 240. When mode switch 366 decouples the antenna 240 from transmit amplifier 368 to receive amplifier 370, the receive amplifier provides a buffered and filtered receive signal to mixer 375. Mixer 375 multiplies the receive signal with a carrier signal from oscillator 380 to frequency downshift the receive signal to baseband or near-baseband.

A demodulator 385 performs filtering, timing recovery, and data detection to convert the downshifted signal into bits. Channel decoder 390 reverses the operations of channel encoder 490 to obtain the series of compressed audio data samples, and audio decoder 345 reconstructs the received series of digital audio samples from the compressed audio data samples. Note that the channel decoder 390 operates on potentially corrupted data to detect bit errors in each packet, correcting them when possible. When an error is corrected, the decoder can optionally flag the relevant audio data sample as being corrected. When errors are detected but not correctable, the audio data sample from that packet may optionally be flagged as having an uncorrectable error. Such flags may be taken into account as part of the processing performed by the processor 340, e.g., with replacement or de-emphasis of the relevant audio data samples to prevent such errors from creating noticeable audio artifacts.

The processor 340 performs binaural processing, whether for beamforming or for providing monaural audio, by summing the left and right signals with optional scaling and/or signal delay. The processing may include directional detection of an audio source with corresponding adaptation of relative channel contributions and delays to increase or decrease sensitivity in that direction. The additional components traversed by the remote audio channel data create a communications latency that may be at least partly compensated by delay buffer 335. The software or firmware stored in memory 360 may cause the processor 340 or a separate microcontroller for transceiver 310 and codec 350 to implement a low-latency wireless streaming method having single-sample audio data packets to minimize communications latency. Alternatively, this method may be implemented using application-specific integrated circuitry.

FIG. 5 is a timing diagram showing how various signals relate in accordance with an illustrative ultra-low latency communications protocol. Reference will be made to one of the hearing instruments as the central hearing instrument, and it is this hearing instrument that controls the timing for the digital communications link. The other hearing instrument will be referred to as the peripheral hearing instrument, which derives a communications clock from the packets sent by the central hearing instrument. For scale, a sample ready clock (SMPL_RDY_CLK) is included and represents a clock signal that could be used by the central hearing instrument to latch the digital audio samples produced by the local A/D converter. The sample ready clock may be asserted at, e.g., 24 kHz, corresponding to a sampling period of just under 42 microseconds. The wireless link may support channel symbol periods of about 1 to 1.5 microseconds, corresponding to between 27 and 42 bits per sampling period for binary FSK signaling. The clock for the central hearing instrument's transmitted packets may be derived from a shared clock source with the sample ready clock.

Also shown are a central receive enable (CNTRL_RX_EN) signal and a peripheral receive enable (PERIPH_RX_EN) signal which may be used to control the mode switches 366, 466. A central transmit signal (CENTRAL_TX here, CTX in FIG. 6) shows the packets transmitted by the central hearing instrument, which arrive at the peripheral hearing instrument as the peripheral receive (PERIPH_RX) signal. Similarly, a peripheral transmit signal (PERIPH_TX here, PTX in FIG. 6) shows the packets transmitted by the peripheral hearing instrument, which arrive at the central hearing instrument as the central receive (CENTRAL_RX) signal. The transmit signal timing is for the input to the channel encoder, while the receive signal timing is for the output of the channel decoder. In some embodiments, the receive enable signals may transition early relative to the completion of packet reception, but this effect is due to the pipeline timing lag between the mode switch and the channel decoder.

In FIG. 5 the central hearing instrument initiates the wireless connection with a preamble packet that includes a preamble (CPRE) and may further include a sync word (SW). The preamble consists of a bit pattern designed to facilitate signal detection and timing recovery by the peripheral hearing instrument's transceiver, while the sync word may be a unique bit pattern used to signal the end of the preamble packet. The channel encoder may be bypassed to facilitate the generation of these patterns in the channel signal.

Typical examples of a preamble pattern include alternating bits or alternating bit pairs, e.g., 010101 . . . or 00110011 . . . . The length of the long preamble may account for the training time typically required by peripheral hearing instrument to derive a communication clock and may span more than one sampling period. The long preamble may be, e.g., 48 bits long, 64 bits long, or more. The sync word may be chosen to be a pattern not found in the preamble or in any sequence of the channel encoder outputs. Though this selection depends on the choice of channel encoder, one example is the eight-bit sequence 11011011. Alternatively, the sync word may be an extension of the preamble pattern, but with inverted bits to signal the transition between the two.

The central hearing instrument may send the preamble packet periodically until a response is detected, giving the peripheral hearing instrument multiple opportunities to detect and respond. Upon achieving accurate timing recovery and sensing the sync word, the peripheral hearing instrument sends a preamble response packet that includes a preamble (PPRE) and the sync word. This preamble may be the same the CPRE preamble, but in practice a shortened preamble may be used. The duration of the preamble response packet may preferably be less than one sampling interval, limiting the length of the short preamble to perhaps 16 bits or so. Because the peripheral hearing instrument employs a communication clock derived from the preamble packet timing, the central hearing instrument's demodulator may require only minimal time for timing recovery and packet data detection. With the exchange of sync words and frequent packet exchanges, the hearing instruments can maintain tight coupling of timing information.

Upon detecting the preamble response packet, the central hearing instrument may send a downlink stream of audio data frames each representing multiple digital audio samples. For the purposes of the following explanation and with reference to FIG. 6, 16 samples are assumed. In practice, each frame may include 128, 256, 512, or more digital audio samples. The frames can be divided into quarters. The data for each digital audio sample is communicated via a corresponding packet. In most cases, the packets are single-sample packets containing only the encoded data for a single audio sample (i.e., audio data plus parity bits), but the first packet of each frame in the downlink stream may be a message packet (MP) that prepends a message word to the encoded data for a single audio sample, and the packet beginning the second quarter of each downlink frame may be a check packet (CP) that prepends a checksum to the encoded data for a single audio sample. In each uplink frame, the packet beginning the second half of the frame may be a message packet, and the packet beginning the fourth quarter may be a check packet.

The message word is a fixed number of bits, e.g., 16 bits or 32 bits, representing a command with any associated parameter value(s). In some contemplated implementations, the command may be a read or write of a selected control register, enabling the central hearing instrument to sense or set the contents of peripheral hearing instrument registers that control its behavior and/or the operating parameters for the communication protocol such as frame length, sample resolution, sample rate, channel encoder configuration, audio codec configuration. For the uplink stream, the message word may be acknowledgements or data in response to such commands, or in the absence of such commands may be status information. The checksum may be a cyclic redundancy check (CRC) for the preceding message word. In at least some contemplated embodiments, it has the same number of bits as the message word, but this is not a requirement.

FIG. 6 shows that immediately following a startup phase 610 (in which the preamble packet and preamble response packets are sent) the central hearing instrument sends a downlink frame 611 consisting of packets that are interleaved with packets of an uplink frame from the peripheral hearing instrument. The only demarcation between downlink frames 611, 612 is the central hearing instrument's sending of a message packet as the first packet of frame 612.

For unidirectional communication, the peripheral hearing instrument need not send single-sample packets, but rather may send only the preamble response packet as part of startup phase 610, and as part of each uplink frame 621, 622, may send the message packet and check packet at the positions where they would be expected in the bidirectional system.

Returning to FIG. 5, each of the packets sent by the peripheral hearing instrument may be sent responsive to a packet from the central hearing instrument, preferably without delay. To the extent possible, the transition from receive to transmit mode may be timed to compensate for any lag in the peripheral hearing instrument's encoders and modulator. For both transmitting and receiving, the peripheral hearing instrument may employ a communication clock derived from the downlink stream packets. For transmission, the central hearing instrument preferably employs a communication clock that is derived from or coordinated with the sample ready clock, perhaps due to both clocks being derived from a shared clock source. Due to a communication lag, the central hearing instrument derives a receive clock based at least in part on the uplink stream packets, but may also rely on the local communication clock, e.g., perhaps using the local communication clock for frequency control and the uplink stream packets for phase control. In this fashion, the downlink stream packets may be coordinated with local audio signal sampling.

Figure 7:
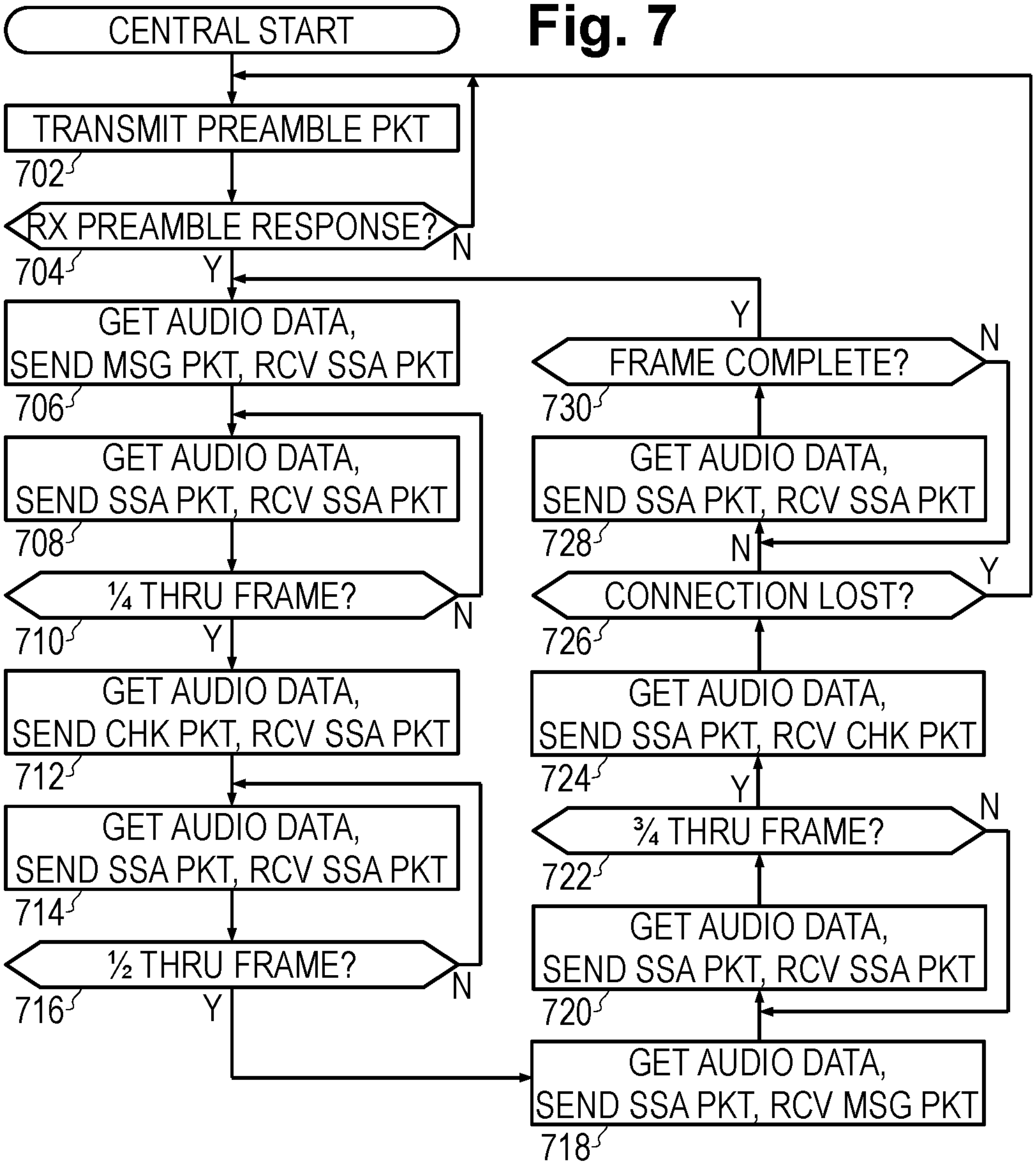
FIG. 7 is a flow diagram of an illustrative communication method for a central hearing instrument.

FIG. 7 is a flow diagram of an illustrative method for the central hearing instrument to implement the disclosed communications protocol. The method may be implemented by the processor or a separate microcontroller of the central hearing instrument. The following discussion uses the term controller to refer to the processor or separate microcontroller. Beginning in block 702, the controller causes the transceiver to send a preamble packet. If no preamble response packet is promptly received in block 704, block 702 may be repeated. In block 706, the controller causes a local digital audio sample to be encoded and appended to a message word (optionally, a word that specifies parameters for the downlink and uplink streams) to form a message packet. The transceiver sends the message packet and responsively receives a single-sample audio data (SSA) packet. In block 708, the controller causes a local digital audio sample to be encoded as an SSA packet. The transceiver sends the SSA packet and responsively receives an SSA packet of the uplink stream. The audio data from the uplink stream is decoded and forwarded to the DSP processor for binaural processing as previously discussed.

Block 708 is repeated until a quarter of the downlink audio data frame has been sent and a quarter of the uplink audio data frame has been received. Once this point is detected in block 710, the controller causes a local digital audio sample to be encoded and appended to a check word for the previous message word to form a check packet. The transceiver sends the check packet and responsively receives an SSA packet in block 712. In block 714, the operations of block 708 are repeated until the halfway point is detected in block 716.

In block 718, the controller causes a local digital audio sample to be encoded and sent as an SSA packet. The transceiver responsively receives an uplink message packet. In block 720, the operations of block 708 are repeated until the three-quarter point is detected in block 722. In block 724, the controller causes a local digital audio sample to be encoded and sent as an SSA packet. The transceiver responsively receives an uplink check packet.

In block 726, the controller evaluates the check packet and uplink message word, possibly in combination with evaluations from previous frames. In some implementations, a single checksum failure may be taken as an indication that the connection is lost and needs to be reset. In other implementations, two or three consecutive checksum failures may be required to determine that the connection is lost and needs to be reset. If such a determination is made, the controller returns to block 702 to restart the connection. Otherwise, in block 728, the operations of block 708 are repeated until the end of frame is detected (via a packet counter) in block 730. Thereafter the controller returns to block 706.

Figure 8:
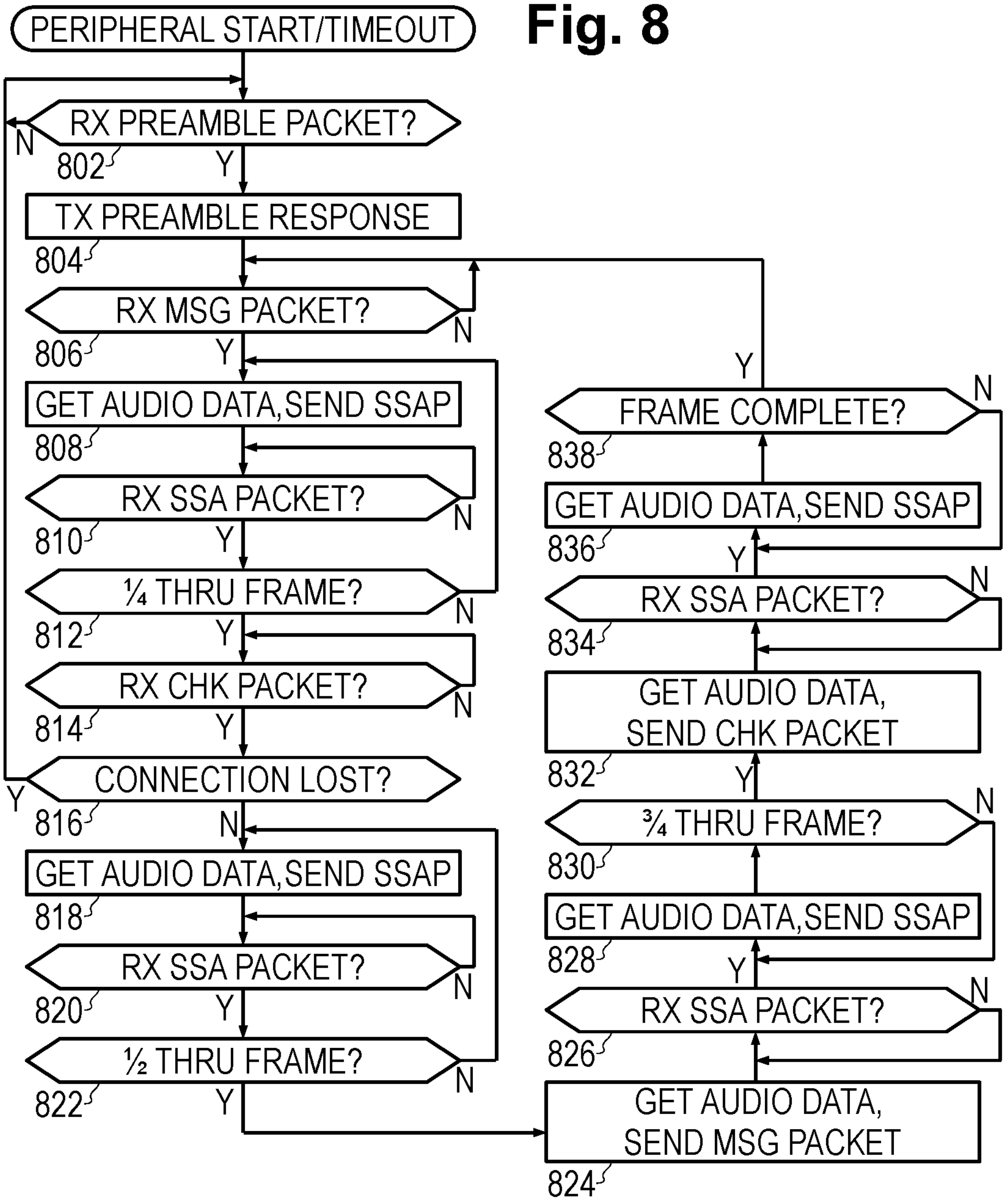
FIG. 8 is a flow diagram of an illustrative communication method for a peripheral hearing instrument.

FIG. 8 is a flow diagram of an illustrative method for the peripheral hearing instrument to implement the disclosed communications protocol. The processor or a separate microcontroller of the peripheral hearing instrument may coordinate the operations of the peripheral hearing instrument components to implement the method. The method includes various listening loops and may be augmented with a watchdog timer or other form of timer to initiate a reset if the controller ever gets stuck in a listening loop.

The controller repeats listening bock 802 until the preamble packet is received, thereafter sending a preamble response packet in block 804. In block 806, the controller listens until a message packet is received, and responds by causing a local digital audio sample to be encoded as an SSA packet and sent in block 808. The audio data from each of the downlink packets is decoded to obtain the downlink audio data stream, which is forwarded to the DSP for binaural processing.

In block 810, the controller listens for SSA packets, returning to block 808 each time one is received until in block 812 the controller determines that a quarter of the downlink frame has been received. In block 814, the controller listens for a check packet and uses it in block 816 to determine whether the connection has been lost and needs to be reset. The determination may be done in a similar fashion as that of block 726 (FIG. 7). For a reset, the controller returns to block 802. Otherwise, the controller proceeds to blocks 818 and 820, which repeat the operations of blocks 808 and 810 until the halfway point is detected in block 822. In block 824, the controller encodes a local digital audio sample and appends it to a message word to form a message packet that is sent by the transceiver. In blocks 826 and 828, the operations of blocks 808 and 810 are repeated until the three-quarter point is detected in block 830. In block 832, the controller encodes a local digital audio sample and appends it to a check word to form a check packet that is sent by the transceiver. In blocks 834 and 836, the controller repeats the operations of blocks 808 and 810 until the end of frame is detected in block 838. Thereafter the controller returns to block 806.

To provide more even timing (and better latency minimization), the central hearing instrument's controller may seek to ensure that all the downlink stream packets end at the same point in the sampling clock period. To this end, the longer packets (i.e., message packet, check packet) may be started earlier in the sampling clock period than the SSA packets. Conversely, the peripheral hearing instrument's controller may operate to start each uplink frame packet at the same point in the sampling clock period, regardless of packet type.

Though the operations of FIGS. 7 and 8 are shown and described in an ordered, sequential fashion, it should be recognized that the various operations may be shared among multiple components that can implement the operations in a pipelined and/or parallel fashion, and that state machines can be used to implement the operations in an asynchronous fashion. Speculative, out-of-order execution of some of the operations may also be possible.

While the foregoing discussion has focused on audio streaming in the context of hearing aids, the foregoing principles can be useful for many applications, particularly those involving audio streaming to or from smart phones or other devices benefitting from low latency wireless audio streaming. Any of the controllers described herein, or portions thereof, may be formed as a semiconductor device using one or more semiconductor dice. Though the operations shown and described in FIGS. 7 and 8 are treated as being sequential for explanatory purposes, in practice the method may be carried out by multiple integrated circuit components operating concurrently and perhaps even with speculative completion. The sequential discussion is not meant to be limiting. These and numerous other modifications, equivalents, and alternatives, will become apparent to those skilled in the art once the above disclosure is fully appreciated.

It will be appreciated by those skilled in the art that the words during, while, and when as used herein relating to circuit operation are not exact terms that mean an action takes place instantly upon an initiating action but that there may be some small but reasonable delay(s), such as various propagation delays, between the reaction that is initiated by the initial action. Additionally, the term while means that a certain action occurs at least within some portion of a duration of the initiating action. The use of the word approximately or substantially means that a value of an element has a parameter that is expected to be close to a stated value or position. The terms first, second, third and the like in the claims or/and in the Detailed Description or the Drawings, as used in a portion of a name of an element are used for distinguishing between similar elements and not for describing a sequence, either temporally, spatially, in ranking or in any other manner. It is to be understood that the terms so used are interchangeable under appropriate circumstances and that the embodiments described herein are capable of operation in other sequences than described or illustrated herein. Inventive aspects may lie in less than all features of any one given implementation example. Furthermore, while some implementations described herein include some, but not other features included in other implementations, combinations of features of different implementations are meant to be within the scope of the invention, and form different embodiments as would be understood by those skilled in the art.

What is claimed is:

1. A communication method that comprises:

transmitting a preamble packet to initiate a wireless connection;

after receiving a preamble response packet, wirelessly sending a downlink stream of audio data frames via the wireless connection; and wirelessly receiving an uplink stream of audio data frames via the wireless connection, the audio data frames of the downlink stream and the uplink stream each comprising a message packet, a check packet, and multiple single-sample audio data packets, the message packet, the check packet, and the multiple single-sample audio data packets of the downlink stream and the uplink stream being without preambles or sync words, and the message packet, the check packet, and the multiple single-sample audio data packets of the downlink stream being interleaved with the message packet, the check packet, and the multiple single-sample audio data packets of the uplink stream.

2. The communication method of claim 1, wherein the preamble packet comprises a preamble and ends with a sync word.

3. The communication method of claim 1, wherein the preamble response packet comprises a preamble and a sync word.

4. The communication method of claim 1, wherein the message packet and the check packet each include a single audio data sample.

5. The communication method of claim 1, further comprising using a shared clock source for sampling audio data for the downlink stream and for said wirelessly sending the downlink stream.

6. The communication method of claim 1, wherein the wireless connection is via near field magnetic induction.

7. The communication method of claim 6, wherein the wireless connection is between a first hearing instrument and a second hearing instrument.

8. A hearing instrument that comprises:

an analog to digital converter that is configured to produce a series of local audio samples;

a digital signal processor that is configured to obtain a series of output audio samples by combining the series of local audio samples with a series of received audio samples;

a digital to analog converter that is configured to convert the series of output audio samples into an output audio signal;

a wireless signal transceiver that is configured to send a downlink stream of audio data frames representing the series of local audio samples and to receive an uplink stream of audio data frames representing the series of received audio samples, the audio data frames of the downlink stream and the uplink stream each comprising a message packet, a check packet, and multiple single-sample audio data packets, the message packet, the check packet, and the multiple single-sample audio data packets of the downlink stream and the uplink stream being without preambles or sync words, and the message packet, the check packet, and the multiple single-sample audio data packets of the downlink stream being interleaved with the message packet, the check packet, and the multiple single-sample audio data packets of the uplink stream.

9. The hearing instrument of claim 8, where the transceiver is configured to initiate a wireless connection with a second hearing instrument by sending a preamble packet that includes a preamble and ends with a sync word.

10. The hearing instrument of claim 9, wherein the transceiver is configured to send the downlink stream only after receiving a preamble response packet having a shortened preamble and the sync word.

11. The hearing instrument of claim 9, wherein the wireless connection is via near field magnetic induction.

12. The hearing instrument of claim 8, wherein the message packet and the check packet each include a single audio data sample.

13. The hearing instrument of claim 8, further comprising a clock source shared by the analog to digital converter and the wireless signal transceiver.

14. A communication method that comprises:

wirelessly receiving a preamble packet to initiate a wireless connection;

responsively transmitting a preamble response packet;

after transmitting the preamble response packet, receiving a downlink stream of audio data frames via the wireless connection, the audio data frames each comprising a message packet, a check packet, and multiple single-sample audio data packets, the message packet, the check packet, and the multiple single-sample audio data packets being without preambles or sync words; and responsive to each of the message packet, the check packet, and the multiple single-sample audio data packets of the downlink stream, sending an audio data frame packet of an uplink stream via the wireless connection, the audio data frame packets of the uplink stream each being one of a message packet, a check packet, and a single-sample audio data packet.

15. The communication method of claim 14, further comprising:

deriving a communication clock from the preamble packet and the downlink stream; and using the communication clock as part of said receiving the downlink stream and as part of said sending the audio data frame packets of the uplink stream.

16. The communication method of claim 14, wherein the preamble packet comprises a preamble and ends with a sync word.

17. The communication method of claim 16, wherein the preamble response packet comprises a shortened preamble and the sync word.

18. The communication method of claim 14, wherein the message packet and the check packet each include a single audio data sample.

19. The communication method of claim 14, further comprising using a shared clock source for sampling audio data for the downlink stream and for said receiving the downlink stream.

20. The communication method of claim 14, wherein the wireless connection is via near field magnetic induction.

* * * * *